United States Patent [19]

Berger et al.

[11] Patent Number: 4,939,380

[45] Date of Patent: Jul. 3, 1990

[54] TOPOGRAPHICAL CAMERA OPERABLE BY APPLYING A GRID-GENERATED MOIRE IMAGE ONTO A CCD IMAGE SENSOR

[75] Inventors: Christa Berger, Freiburg; Heinrich Hofler, Teningen; Otmar Fichter, March, all of Fed. Rep. of Germany

[73] Assignee: Fraunhofer-Gesellschaft zur Forderung der angewandten Forschung e.V., Munich, Fed. Rep. of Germany

[21] Appl. No.: 346,952

[22] Filed: May 3, 1989

[30] Foreign Application Priority Data

May 24, 1988 [DE] Fed. Rep. of Germany ....... 3817559

[51] Int. Cl.$^5$ .................. H01J 40/14; G01B 11/14
[52] U.S. Cl. ..................... 250/578.1; 250/237 G; 356/374
[58] Field of Search ............... 250/578, 211 J, 237 G; 356/374

[56] References Cited

U.S. PATENT DOCUMENTS

| | | | |
|---|---|---|---|
| 3,932,775 | 1/1976 | Kosonocky | 250/211 J |
| 4,272,196 | 6/1981 | Indebetouw | 356/371 |
| 4,539,598 | 9/1985 | Dietrich et al. | 250/578 |
| 4,543,601 | 9/1985 | Harada et al. | 250/578 |
| 4,676,596 | 1/1987 | Kato et al. | 250/578 |

FOREIGN PATENT DOCUMENTS 3638525  5/1988  Fed. Rep. of Germany .

OTHER PUBLICATIONS

Optics and Laser Technology, vol. 16, No. 6, Dec. 1984, pp. 315-319, Butterworth & Co. (Publishers) Ltd., Guildford, Surrey, GB; G. T. Reid et al.
Applied Optics, vol. 24, No. 11, June 1, 1985, pp. 1565-1566, New York, U.S.
Optics Communications, vol. 34, No. 2 of Aug. 1980, pp. 167-170, Amsterdam, NL, Lohmann and Lu Po-Shiang "Computer Generated Moire".

*Primary Examiner*—David C. Nelms
*Assistant Examiner*—William Oen
*Attorney, Agent, or Firm*—Jeffers, Hoffman & Niewyk

[57] ABSTRACT

A camera for recording the topography of a specimen surface by generation of a Moire image with the aid of an object grid applied on the object, and which includes a CCD sensor with a reference grid (8) which is applied as a physical grid structure directly on the light incidence surface (4) of the CCD sensor.

8 Claims, 1 Drawing Sheet

4,939,380

TOPOGRAPHICAL CAMERA OPERABLE BY APPLYING A GRID-GENERATED MOIRE IMAGE ONTO A CCD IMAGE SENSOR

BACKGROUND OF THE INVENTION

The invention concerns a camera for recording the topography of a specimen surface by generation of a Moire image with the aid of an object grid and a reference grid.

Moire processes are based on optically superposing two regular structures, such as line grids with grid constants of approximately equal size. The object grid which is applied or projected on the specimen is reproduced on a reference grid. The deformations of the object grid due to the topographic properties produce in the plane of the reference grid characteristic Moire lines.

From the IBM technical disclosure bulletin Vol. 25, No. 1, pages 357-358 (1982) it is known to reproduce the object grid contained on the specimen on a physical grid. The Moire lines created in this focal plane are recorded with the aid of a second projection by a CCD receiver camera. This second projection of Moire lines could be effected also by any other camera or on a photographic film.

The second projection is associated with considerable intensity losses, which requires a very high luminous intensity on the object. Especially with large-area specimens this is very difficult or expensive to accomplish, so that the prior art permits only small-area specimens or a low resolution.

A way out is constituted by the direct use of a CCD image sensor as a reference grid. The line or column structure of the sensor matrix can be used directly as the grid structure of a reference grid. While the resulting Moire images are not associated with intensity losses, so that a large specimen surface can be viewed, they nonetheless permit only a low resolution caused by the low number of lines/columns in the case of CCD image sensors. Such CCD sensors enable several hundred lines. While a combination of several CCD image sensors increases the line number of the reference grid, such requires a technically considerably more expensive and slower readout process of the obtained image.

Based on this prior art, the problem underlying the invention is to provide a camera of the initially mentioned type which has a high resolution and a large coverage.

SUMMARY OF THE INVENTION

The above-identified problem is inventionally solved by the use of a reference grid which is applied as a physical grid structure directly, without an intermediate projection lens, on the light incidence surface of the light sensitive image sensor.

By application of the reference grid as additional physical grid structure directly in the focal plane in which the Moire lines are recorded for processing, the only additional intensity losses are those that are caused by the nontransparent part of the applied grid. With a 1:1 rectangular amplitude grid the light reduction amounts thus to only 50%. Through a grid constant of a few micrometers, which technically is possible in thin film processes, the number of grid lines participating in the generation of the Moire structure increases from a few hundred to several thousand lines. The upper limit of the usable line number lies then only in the quality of the CCD camera lens used.

In a preferred embodiment of the invention, the use of an image conductor in the focal plane of a usual CCD image sensor proceeds in such a way that the entrance plane of the image conductor will reside in the focal plane of the projected object grid. The application of the reference grid on the entrance plane of the image conductor introduces the above-mentioned advantages while at the same time dissociating the CCD image sensor chip from the manufacturing process of the reference grid, in which then only the image conductor, which technically is

BRIEF DESCRIPTION OF THE DRAWINGS

Embodiments of the invention will be more fully explained hereafter with the aid of the drawings, wherein.

Corresponding reference characters indicate corresponding parts throughout the several views of the drawings.

The exemplifications set out herein illustrate a preferred embodiment of the invention, in one form thereof, and such exemplifications are not to be construed as limiting the scope of the disclosure or the scope of the invention in any manner.

DESCRIPTION OF THE PREFERRED EMBODIMENT

Figure 1:
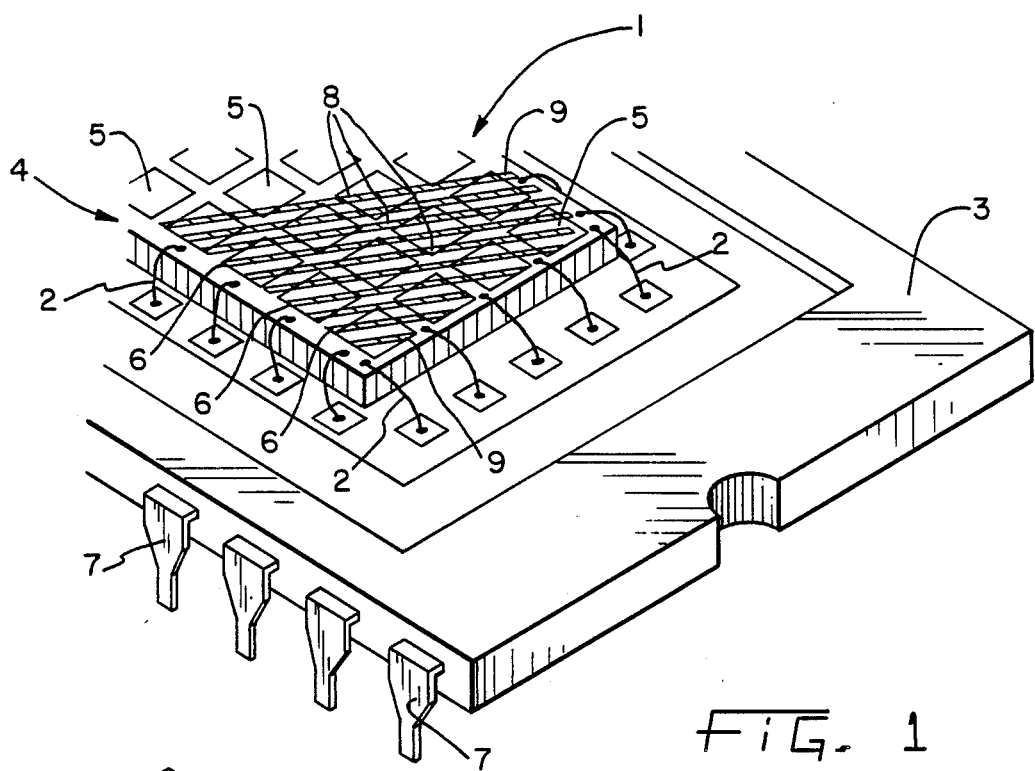
FIG. 1 shows a schematic, perspective view of a section of a CCD image sensor according to a first embodiment of the invention.

FIG. 1 shows a perspective view of a section of a first embodiment of the invention. Schematically drawn is a charge-coupled light detector matrix, which hereafter will briefly be called a CCD image sensor 1, which through leads 2 is connected with a carrier plate 3. In its focal plane 4, the CCD image sensor 1 is constructed from picture elements 5 in rows and columns 6, showing for the sake of clarity in FIG. 1 only four columns 6. As usual, the CCD image sensor comprises several hundred rows and columns 6.

The image, recorded with the aid of picture elements 5, is transmitted through prongs 7 to an image processing circuit in which the columns 6 of the image sensor 1 form a grid in a projection Moire process, for instance in a projection Moire process for the large-area topographic measurement of a specimen.

As FIG. 1 schematically shows, a reference grid 8, of alternately transparent and nontransparent strips, is applied directly on the focal plane 4. A favorable technique for application of a reference grid 8 in the form of a rectangular amplitude grid on the usual $SiO_2$ protective coating of the CCD image sensor 1 in the focal plane consists in the utilization of thin film processes—for instance vacuum plating or sputtering—and subsequent photolithographic structuring. Chromium/chromoxide can be used in thin film processes as well as adhering and structurable materials.

Grid constants in the range of 1 to 5 um are possible with these processes, so that with a size of the focal plane 4 of the CCD image sensor 1 of about 10×10 mm$^2$ a grid line number of 2,000 to 10,000 is obtained, of which FIG. 1 shows for simplification only a few grid lines 9.

The number of grid lines 9 is considerably larger than the number of columns 6 of the CCD image sensor 1 so as to obtain a small grid constant for the reference grid 8 and to avoid undesirable Moire phenomena by superimposition of the reference grid 8 with the grid of the columns 6 of the image sensor 1. For that purpose, three grid lines 9 per picture element 5 in the columns 6 of the image sensor 1 are sufficient, with the reference grid 8 preferably being applied diagonally to the columns 6 of the image sensor 1 in order to increase that number. However, the said Moire phenomena occur at an arbitrary angle of the reference grid 8 to the columns 6 of the CCD image sensor 1.

Figure 2:
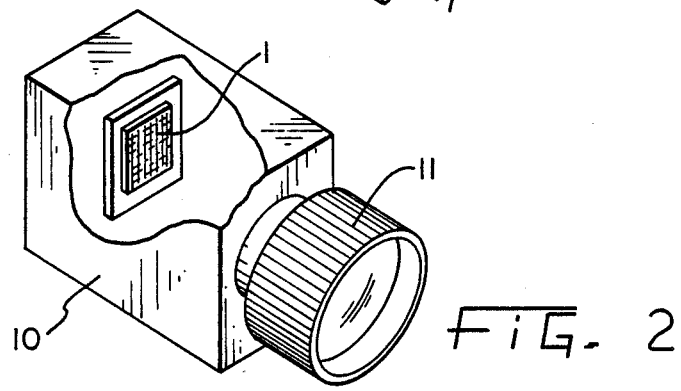
FIG. 2 shows a perspective view of a CCD camera with a CCD image sensor according to the invention.

FIG. 2 shows a CCD camera 10 in which the CCD image sensor 1 is installed in the focal plane of the camera. The quality of the lens 11 of the CCD camera 10, due to its lateral resolution in projecting the object grid on the reference grid 8, limits the maximally usable number of lines, which ranges at 20 grid lines per picture element 5 in the columns 6 of the CCD image sensor 1.

Figure 3:
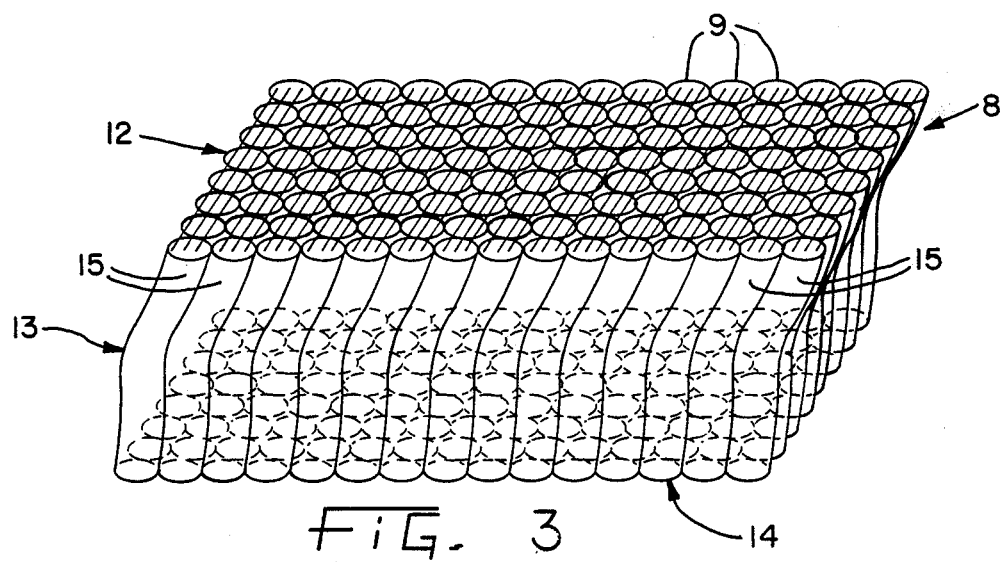
FIG. 3 shows a perspective view of a section of an image conductor for a CCD image sensor according to a second embodiment of the invention.

To utilize the advantages of a single projection, the reference grid 8 must be located in the optically immediate vicinity of the focal plane 4 in which the Moire lines are recorded for processing. According to a second embodiment pursuant to FIG. 3, this problem can be solved also in a way such that the reference grid 8 is applied on the entrance plane 12 of an image conductor 13 whose back 14 is in direct contact with a usual CCD image sensor 1. FIG. 3 shows a section of the image conductor 13, the length of which from the incident plane 12 to the backside 14 is selective.

In addition to the condition that the number of grid lines 9 must be greater than the number of columns 6 of the CCD image sensor 1, the image conductor 13 needs to be so selected that the number of transmission fibers 15 is greater than the number of picture elements 5 of the CCD image sensor. The reference grid 8 is formed by the process explained in the first embodiment, offering here the advantage that the fabrication process of the CCD image sensor 1 need not be interfered with.

For reasons of pictorial presentation, the grid lines 9 of the reference grid 8 are schematically illustrated in FIGS. 1 and 3 as parallel lines with spaces of equal width. The rectangular amplitude grid thus indicated may be replaced also by a sinusoidal grid or by a grid following another function extending between 0% and 100% in transparency. The grid lines 9 may also curve in longitudinal direction along the grid plane. Moreover, the ratio of the grid line spacing to their width may as well be chosen other than 1:1. This will improve height measurements of curved surfaces through the generation of simpler Moire images.

While this invention has been described as having a preferred design, it will be understood that the invention is not limited thereby. Therefore, it is intended that the scope of the invention include any variations, uses or adaptations of the invention following the general principles thereof and including such departures from the disclosed embodiment as come within known or customary practice in the art to which the invention pertains and which fall within the appended claims or the equivalents thereof.

What is claimed is:

1. Camera for recording the topography of a specimen surface by generation of a Moire image with the aid of an object grid applied on the object and a reference grid coordinated with the camera, characterized in that the reference grid is applied as physical grid structure directly, without use of an intermediate projection lens, on the light incidence surface of the lightsensitive image sensor.

2. Camera according to claim 1, characterized in that the camera features a CCD image sensor with a number of picture elements in a focal plane on which the reference grid is applied in the form of a number of transparent and nontransparent strips.

3. Camera according to claim 2, characterized in that the strips extend parallel or diagonally to the columns of the CCD image sensor.

4. Camera according to claim 2, characterized in that the number of strips amounts to a multiple of the number of columns.

5. Camera according to claim 1, characterized in that the camera includes a CCD image sensor with a plurality of picture elements in a focal plane which is coupled directly with the backside of an image conductor on the incidence plane of which the reference grid is applied in the form of a number of transparent and nontransparent strips.

6. Camera according to claim 5, characterized in that with each picture element there is coordinated at least one transmission fiber of the image conductor.

7. Camera according to claim 6, characterized in that with each transmission fiber of the image conductor there are coordinated several strips of the reference grid.

8. Camera according to claim 2, characterized in that the reference grid is formed in a thin film process by vacuum plating or sputtering with subsequent photolithographic processes for structuring.

* * * * *